United States Patent [19]

Waxman et al.

[11] Patent Number: 5,555,324
[45] Date of Patent: Sep. 10, 1996

[54] METHOD AND APPARATUS FOR GENERATING A SYNTHETIC IMAGE BY THE FUSION OF SIGNALS REPRESENTATIVE OF DIFFERENT VIEWS OF THE SAME SCENE

[75] Inventors: Allen M. Waxman, Newton; David A. Fay, Somerville; Alan N. Gove, Brookline; Michael C. Seibert, Bedford; Joseph P. Racamato, Tewksbury, all of Mass.

[73] Assignee: Massachusetts Institute of Technology, Cambridge, Mass.

[21] Appl. No.: 332,696

[22] Filed: Nov. 1, 1994

[51] Int. Cl.⁶ .................................... G06K 9/40
[52] U.S. Cl. .................... 382/254; 382/274; 382/263; 382/162
[58] Field of Search ............... 382/263, 265, 382/266, 154, 254, 162, 274

[56] References Cited

U.S. PATENT DOCUMENTS

| 4,086,616 | 4/1978 | Catano et al. | 358/81 |
|---|---|---|---|
| 4,337,044 | 6/1982 | Palmer | 434/11 |
| 4,626,905 | 12/1986 | Schmidt | 358/87 |
| 4,672,439 | 6/1987 | Florence et al. | 358/113 |
| 4,683,496 | 7/1987 | Tom | 358/166 |
| 4,685,071 | 8/1987 | Lee | 364/526 |
| 4,724,354 | 2/1988 | Dill | 313/371 |
| 4,751,571 | 6/1988 | Lilquist | 358/113 |
| 5,001,558 | 3/1991 | Burley et al. | 358/113 |
| 5,035,472 | 7/1991 | Hansen | 350/1.1 |
| 5,040,064 | 8/1991 | Cox | 358/163 |
| 5,049,995 | 9/1991 | Shimoni | 358/211 |
| 5,051,821 | 9/1991 | Vittot et al. | 358/81 |
| 5,083,204 | 1/1992 | Heard et al. | 358/113 |
| 5,162,647 | 11/1992 | Field, Jr. | 250/214 |
| 5,214,503 | 5/1993 | Chiu et al. | 358/50 |
| 5,220,620 | 6/1993 | Nakano et al. | 382/191 |
| 5,233,183 | 8/1993 | Field | 250/214 |

FOREIGN PATENT DOCUMENTS

| 0598454 | 11/1993 | European Pat. Off. ........ G01C 11/00 |
| WO90/05426 | 5/1990 | WIPO . |

OTHER PUBLICATIONS

Samuel A. Ellias et al., "Pattern Formation, Contrast Control, and Oscillations in Short Term Memory of Shunting On–Center Off–Surround Networks", Biol. Cybernetics 20, 69–98 (1975).

Robert K. Reich et al., "Integrated Electronic Shutter for Back Illuminated Charge–Coupled Device", IEEE Transactions on Electron Devices, vol. 40, No. 7, Jul. 1993.

Peter Gouras, "Principles of Neural Science", Elsevier Science Publishing Co., 3rd ed., Chapter 31, pp. 468–480 1991.

Charles Hanson et al., "Infrared Detectors: State of the Art", vol. 1735, pp. 17–26, (1992).

(List continued on next page.)

*Primary Examiner*—Leo Boudreau
*Assistant Examiner*—Monica S. Davis
*Attorney, Agent, or Firm*—Lappin & Kusmer

[57] ABSTRACT

A method and system for processing two input digital image signals, each being representative of a different two dimensional view of the same scene, to produce three processed image signals. A center-surround shunt processor transforms each input image signal to produce a respective processed image signal. Another center-surround shunt processor produces the third processed image signal from the first two processed image signals. In the latter processor, one of the first two processed image signals is selected as a center image and the other is selected as a surround image. The processor performs a computation associated with each pixel in the center image with data selected from the center image to form a central element for the computation and data selected from the surround image to form a surround element for the computation. The result of each computation is a pixel of the third processed image signal. The three processed image signals may be applied to the respective RGB inputs of an RGB display device.

86 Claims, 9 Drawing Sheets

OTHER PUBLICATIONS

Charles Hanson et al., "Low Cost Uncooled Focal Plane Array Technology", pp. 1–9, (1993).

Robert E. Flannery et al., "Status of Uncooled Infrared Images", SPIE vol. 1689, Infrared Imaging Systems, (1992), pp. 379–395.

Bellec et al. (1992) *Int. J. Remote Sensing* 13:1981–1998.

Courtney et al. (1992) *International Joint Conference on Neural Networks* 4:55–60.

Yamaba et al. (1993) *SPIE Applications of Digital Image Processing* 2028:368–374.

Allen M. Waxman et al., "Visual Learning of Objects: Neural Models of Shape, Color, Motion and Space", IEEE Neural Networks Council, pp. 237–251, (1994).

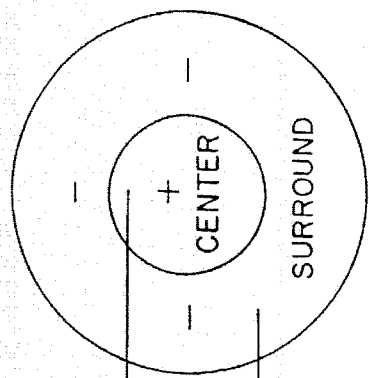

SHUNTING DYNAMICS -

$$\frac{dx_i}{dt} = -Ax_i + (B-x_i)CG_{0_{in}} * I - (D+x_i)G_{0_{out}} * I$$

EQUILIBRIUM -

$$x_i = \frac{(BCG_{0_{in}} - DG_{0_{out}}) * I}{A + (CG_{0_{in}} + G_{0_{out}}) * I} = \frac{\text{LINEAR FILTER}}{\text{NORMALIZATION}}$$

LINEAR FILTER -

$BC = D \longrightarrow$ BANDPASS (PURE CONTRAST)

$BC > D \longrightarrow$ BANDBOOST (CONTRAST + LOCAL DC)

NORMALIZATION (LOCAL GAIN CONTROL) -

$A << SoG * I$    RATIO PROCESSING (DISCARD THE ILLUMINANT)

$A >> SoG * I$    LINEAR PROCESSING (RETAIN THE ILLUMINANT)

$A \approx SoG * I$ and $BC > D$    MONOTONIC PROCESSING (MIX CONTRAST & ILLUMINANT)

*FIG. 3*

METHOD AND APPARATUS FOR GENERATING A SYNTHETIC IMAGE BY THE FUSION OF SIGNALS REPRESENTATIVE OF DIFFERENT VIEWS OF THE SAME SCENE

This invention was made with government support under Contract Number F19628-90-C-0002 awarded by the Air Force. The government has certain rights in the invention.

BACKGROUND OF THE INVENTION

The present invention relates to apparatus and methods for generating a synthetic image, and more particularly relates to a system for combining information generated in response to two different detectable characteristics to produce an enhanced color output image.

In general, a digital image contains data that is generated by a transducer responsive to a particular detectable characteristic of a scene. If the data generated by the transducer is manipulated, for example to enhance the quality of the image, the resultant image is generally referred to as a synthetic image. By way of example, a night vision system might gather light from a scene and generate a synthetic image of the scene, using processing to enhance certain features of the image to improve its utility.

Night vision systems are useful in a variety of applications, such as in automated target identification systems and in night vision scopes which are used, for example, by law enforcement and military agencies for both surveillance and mobility purposes. For example, a helicopter pilot following a road through a forest at night requires a night vision system that is capable of distinguishing the road from the forest canopy. Further, in order to permit safe operation of the helicopter, the night vision system must also reliably detect changes in elevation of the forest canopy. Similar needs for enhanced night mobility and targeting are relevant to the soldier on the ground, on foot or in vehicles.

As is well known in the night vision arts, data gathered from different sources, such as from transducers responsive to light from different optical spectral ranges representative of the same scene, provide different and complementary types of visual information. Continuing the previous night flying helicopter example, a road is typically a good source of Long Wave Infrared (LWIR or thermal infrared) light at night while a forest is not. Consequently LWIR sensors are particularly useful for locating a road within a forest. Since the temperature of a forest does not change rapidly with changes in elevation, LWIR sensors are not particularly useful for locating hills and mountains in a forest. However, a forest canopy is a relatively good reflector of Visible through Near-Infrared (VIS-NIR) reflected light, which may be caused by starlight, while a road is not. Consequently, sensors which detect low level VIS-NIR reflected light can be particularly useful for locating hills and mountains, but are not particularly useful for locating a road within a forest.

Scopes which allow a pilot to switch between a LWIR sensor and a VIS-NIR sensor, and systems which present the output of both types of sensors on two different monitors, are known, but those systems are generally of limited utility because they require too much effort on the part of the pilot to integrate the data.

There is therefore a need for a system that combines information from two different sensor sources and generates a single image, i.e., a synthetic image, that reliably presents the data from the different sensors. Further, the system must combine the data in a meaningful way so that a human observer can easily absorb the data.

Another problem with known night vision scopes relates to the dynamic range compression that is necessary to display an output image on a small inexpensive monitor which typically has a much smaller dynamic range than the commonly used light sensing elements, such as CCDs or infrared cameras. In the prior art, dynamic range compression is typically achieved through a global scaling which although is computationally simple, generally yields inadequate performance. Global scaling generally involves transforming the maximum and minimum values of the sensor output to the brightest and darkest points, respectively, that the monitor is capable of displaying, and linearly transforming all other sensor output values to points between these extreme bright and dark points. This type of scaling insures that the output image is displayed using the full dynamic range of the monitor, however it also typically results in the loss of much rich contrast information. For example, in an infrared image of a scene that is mostly cool and has one hot spot, global scaling typically compresses all contrast information in the cool regions to the same uniform dark value for the sake of displaying the single hot spot. Similar problems arise when displaying a low-light visible image of a scene with wide intra-scene dynamic range.

There is therefore a need for a night vision system having local automatic gain control such that it generates output images which preserve useful contrast information in both the bright and dark regions of the display.

Accordingly, it is an object of the invention to provide an improved method and apparatus for combining visual information from two different sources into a single output image.

It is a further object of the invention to provide a night vision system having automatic gain control for generating output images that preserve contrast information in both the bright and dark regions of the display.

Other objects and advantages of the present invention will become apparent upon consideration of the appended drawings and description thereof.

SUMMARY OF THE INVENTION

In one aspect, the present invention relates to a method for combining first and second input image signals, each of which is representative of a different two dimensional view of the same scene, to produce first, second and third processed image signals. The latter signals may be applied to a color display device. The input images processed by the method are each represented as a two dimensional array of pixels in which each pixel has value representative of a detectable characteristic at a position in the scene corresponding to that pixel.

A center-surround shunt processing step transforms the first input image signal to produce the first processed image signal. Similarly, a center-surround shunt processing step transforms the second input image signal to produce the second processed image signal. In each of these center-surround shunt processing steps, a computation associated with each pixel in the input image signal is performed. In each of those computations, pixels in a neighborhood including at least that computation's associated pixel collectively form a central element for the computation, and pixels in a neighborhood at least surrounding the central element collectively form a surround element for the computation. The result of each of those computations is a pixel of the corresponding first or second processed image signal. These processed image signals represent contrast enhanced and locally normalized versions of the original image signals.

A center-surround shunt processing step then produces the third processed image signal from the first and second processed image signals. In this step, one of the first and second processed image signals is chosen as a center image and the other of the first and second processed images signals is chosen as a surround image. A computation associated with each pixel in the center image is performed, and in each of those computations, data is selected from the center image to form a central element for the computation and data is selected from the surround image to form a surround element for the computation. Pixels in a neighborhood including at least that computation's associated pixel of the central image form the central element, and pixels in a neighborhood at least surrounding a correspondingly positioned central element in the surround image form the surround element. The result of each computation is a correspondingly positioned pixel of the third processed image signal. This processed image signal represents an opponent-color contrast image.

The resultant first, second and third processed signals form the basis for generating a synthetic image useful in night vision systems, as well as in other sensory enhancing systems.

One preferred method of displaying the three processed image signals is to apply each of them to one of the red (R), green (G), and blue (B) inputs of an RGB display device. Another preferred display method includes a step of transforming the first, second, and third processed image signals in accordance with an RGB transform operator to generate corresponding hue (H), saturation (S), and value (V) signals. User modification of the H, S, and V signals is then allowed, and then an inverse transform step transforms the modified H, S, and V signals in accordance with an inverse RGB transform operator to generate corresponding modified R, G, and B signals which are then applied to the R, G, and B inputs of an RGB display device. More generally, combinations of the three processed images may be directly mapped to either RGB or HSV color spaces, and used as inputs to a color display device.

The method of combining the first and second input image signals to form the first, second, and third processed image signals, may include a precursor step of generating the first and second input image signals. In one preferred embodiment, one of the input image signals is representative of reflected light from the scene and the other input image signal is representative of emitted light from the scene. In other embodiments, both input images are representative of reflected light, and in still other embodiments, both images are representative of emitted light from the scene. In still other embodiments, the first and second input image signals are generated in response to the acquisition of data representative of detectable characteristics associated with different views of the scene. In one embodiment, both input image signals are generated in response to the same detectable characteristic. In another embodiment, the input image signals are generated in response to different detectable characteristics. In all of these embodiments, the detectable characteristic may be selected from a group consisting of electromagnetic energy reflected from the scene, electromagnetic energy emitted from the scene, acoustic energy reflected from said scene, acoustic energy emitted from the scene, or other detectable characteristics. In one preferred embodiment, one of the input images is generated in response to VIS-NIR light from the scene having wavelengths in the range of 0.4 to 1.1 microns, and the other input image is generated in response to Long Wave Infrared (LWIR) light from the scene having wavelengths in the range of 7.5 to 13 microns. In other embodiments, both input images are generated in response to light having wavelengths in portions of the 0.4 to 1.1 micron range and both portions are substantially non-overlapping. In yet another embodiment, both input images are generated in response to light having wavelengths in portions of the 7.5 to 13 micron range and both portions are substantially non-overlapping. Various permutations may also be used.

In other embodiments, the first and second input image signals are generated in response to acquisition of data representative of the views of the scene in which each of the views is taken along an axis extending to the scene, and the two axes are substantially coincident. In other embodiments, the axes maybe substantially parallel and spaced apart by a predetermined or an unknown distance, or they may be angularly offset and substantially intersect at the scene. In these embodiments, the first and second input image signals may be representative of views of the scene that are substantially in registration, or alternatively, they may be representative of views of the scene that are out of registration in a determinable manner. The data acquisition for the two input images may occur at substantially the same time or alternatively, may be separated by a time interval.

In the preferred method, each of the computations for generating the first, second, and third processed image signals, includes calculating a difference between a weighted average of the values of the pixels in one of the central elements and a weighted average of the values of the pixels in one of the surround elements, and the computation further includes calculating a sum of a constant and a weighted average of the values of the pixels in one of the central elements and a weighted average of the values of the pixels in one of the surround elements, and the computation further includes calculating a quotient of the difference and the sum. In the preferred embodiment, the weighted averages are Gaussian distributed averages.

In other aspects, the invention relates to systems for producing the processed image signals including processing devices for implementing the center-surround shunt processing. The processing devices may be implemented as programmed digital computers or as dedicated hardware such as a portable set of integrated circuit chips.

A preferred system according to the invention further includes assemblies for generating the first and second input image signals such that the first input image is representative of reflected light from the scene having wavelengths in the range of 0.4 to 1.1 microns, and such that the second input image is representative of emitted light from the scene having wavelengths in the range of 7.5 to 13 microns.

In one system according to the invention, the assembly for generating the first input image signal includes a reflected light input optical assembly which receives reflected light from the scene to establish the view to which the first input image corresponds, and transfers this received light to an output optical port. An electro-optic camera having an input electro-optic port generates a reflected light signal, corresponding to the first input image signal, representative of light applied to the electro-optic input port. An image intensifier coupled to the output optical port intensifies and transfers light from the output optical port to the input electro-optic port. The assembly for generating the second input image signal includes an emitted light input optical assembly which receives emitted light from the scene to establish the view to which the second input image corresponds, and transfers this received light to an output optical port. A thermal camera having an input thermal port generates an emitted light digital signal corresponding to the second input image signal representative of emitted light applied to the input thermal port, and a coupler coupled to the output optical port of the emitted light input optical assembly transfers light from the output optical port to the input thermal port. This system may further include a common axis input assembly including an aperture for receiving the reflected and the emitted light along a common axis from the scene, and a beam splitter for transferring a portion of the reflected light received by the aperture to the reflected light input optical assembly, and for transferring a portion of the emitted light received by the aperture to the emitted light input optical assembly. In one embodiment the beam splitter includes a dichroic mirror that is positioned along the common axis and is substantially transparent of reflected light and substantially reflective to emitted light.

The preferred system according to the invention includes an aperture for receiving the reflected and the emitted light along a common axis from the scene. This system further includes a beam splitter including a dichroic mirror that is positioned along the common axis and is substantially transparent to reflected light and is substantially fully reflective to emitted light. The beam splitter further includes a first transfer medium and associated lens for transferring the reflected light passing through the dichroic mirror to the assembly for generating the first input image signal, and a second transfer medium and associated lens for transferring emitted light reflected from said dichroic mirror to the assembly for generating the second input image signal. In these systems, the preferred assembly for generating the first input image signal includes a low light CCD array, and the preferred assembly for generating the second input image signal includes a LWIR imager. These systems further preferably include a display device and couplers for applying the first, second, and third processed image signals to the display device which generates a synthetic image therefrom. In the preferred embodiment, the assemblies for generating the first and second input image signals, the common axis input assembly, and the display device are all within a single housing.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

For a fuller understanding of the nature and the objects of the invention, reference should be made to the following detailed description and the accompanying drawings in which like reference numerals refer to like elements and in which:

FIG. 3 illustrates some of the salient features of the invention shown in FIG. 1;

DETAILED DESCRIPTION OF THE PREFERRED EMBODIMENT

Figure 1:
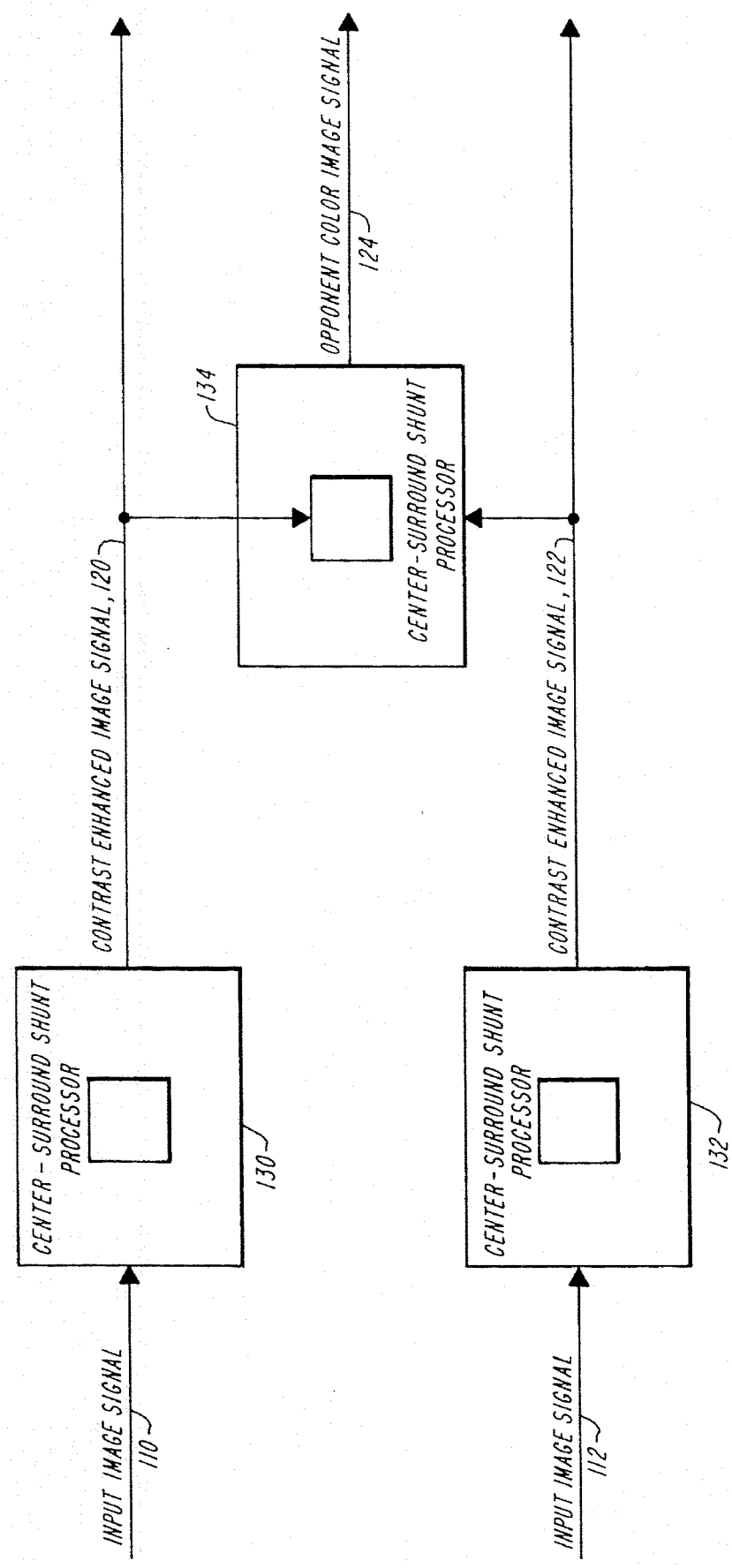
FIG. 1 is a block diagram illustrating the invention in which two input image signals are combined to produce two contrast-enhanced image signals and an opponent color image signal.

FIG. 1 illustrates a form of the invention for combining two input image signals 110, 112 to from three output image signals 120, 122, 124. Input image signals 110, 112 are generated such that each corresponds to a different two dimensional view of the same scene. Each of the input images is represented as a two dimensional array of pixels such that each pixel corresponds to a region of the scene, and each pixel has a value corresponding to a detectable characteristic measured at that pixel's corresponding region.

When this method is implemented in a preferred night vision system according to the invention, the input image signal 110 is preferably generated by a camera responsive to Visible through Near Infrared (VIS-NIR) light, and the input image signal 112 is preferably generated by a camera responsive to Long Wave Infrared (LWIR) light. However, as those skilled in the art will appreciate, input image signals 110, 112 may be generated in a variety of different ways.

As shown in FIG. 1, a center-surround shunt processor 130 is responsive to input image signal 110 to generate a first processed image 120. Similarly, a center-surround shunt processor 132 is responsive to input image signal 112 to generate a second processed image 122. Finally, as discussed in detail below, the first processed image signal 120 and the second processed image signal 122 are applied to the center and surround inputs of a third center-surround shunt processor 134, which in turn generates a third processed image signal 124. The application of signals 120 and 122 to the center and surround inputs of processor 134 may be reversed, but it is the application of a center-derived signal to one input, and the application of a surround derived signal to the second input of that third processor that provides an improved set of processed image signals. The processors 130, 132 and 134 which produce the processed image signals will now be discussed.

The basic computation used to produce the processed, or contrast-enhanced, images is a center-surround shunt type computation characterized by a central excitatory region and an inhibitory surround region. This type of computation is suggestive of contrast processing performed at the retinal stage of the human visual system and has been discussed at length in neural network literature such as Ellias and Grossberg, *Pattern Formation, Contrast Control, and Oscillations in the Short Term Memory of Shunting On-Center Off-Surround Networks*, Biol. Cybernetics 20. 69–98 (1975).

Those skilled in the art will appreciate that the center-surround shunt computation can be implemented in a variety of ways, all of which will function well with the invention. The preferred center-surround computation is governed by the shunting dynamics given by Equation (1)

$$\frac{dx_i}{dt} = -Ax_i + (B - x_i)CG_{\sigma_{in}} * I - (D + x_i)G_{\sigma_{out}} * I \quad (1)$$

in which I is an input image signal; $x_i$ is the value of the ith pixel of a processed image; $G_{\sigma in}$ and $G_{\sigma out}$ are Gaussian weighted averaging masks; * is the convolution operator; and A, B, C, and D are constants. The $-Ax_i$ term represents a decay, the $(B-x_i)CG_{\sigma_{in}}*I$ term represents the excitatory center region, and the $-(D+x_i)G_{\sigma_{out}}*I$ term represents the inhibitory surround region. $\sigma_{in}$ is smaller than $\sigma_{out}$ such that the Gaussian mask for the center region ($G_{\sigma on}$) covers fewer pixels than does the Gaussian mask for the surround region ($G_{\sigma out}$). In practice $G_{\sigma in}$ is preferably the constant, unity, meaning that the center region is taken as a single pixel (in order to preserve resolution). One preferred choice for $G_{\sigma out}$ is a 5×5 Gaussian weighted mask such as the one shown in FIG. 2A. Another preferred choice for $G_{\sigma out}$ is a 9×9 Gaussian weighted mask which, since the Gaussian is separable, may be implemented by two convolutions with the 9×1 mask shown in FIG. 2B, the first convolution being against the rows of the image and the second convolution being against the columns. As those skilled in the art will appreciate, many choices for $\sigma_{in}$ and $\sigma_{out}$ will function well.

Equation (1) is based on a neural network model in which each pixel $x_i$ represents the activity of a single neuron, and an input image signal therefore corresponds to a stimulus presented to a neural field. When a new image signal is input to the neural field, e.g., say input image signal 110, all the $x_i$s are set to values corresponding to the pixel values of the image. All the $x_i$s are then allowed to fluctuate as governed by the dynamics of Equation (1), and when the network comes to equilibrium, the new $x_i$s are taken as the pixel values of the contrast-enhanced image signal 120. As those skilled in the art will appreciate, the $x_i$s need not be set to initial values corresponding to the input image, regardless of their initial value the $x_i$s will eventually converge to the same equilibrium value.

Equilibrium is achieved when all the $dx_i/dt$ values become zero. Equation (2) gives the value for $x_i$ at equilibrium and is derived simply by setting the left side of Equation (1) to zero and solving for $x_i$. Processors 130, 132 therefore use Equation (2) to compute the processed image signals.

$$x_i = \frac{(BCG_{\sigma_{in}} - DG_{\sigma_{out}})*I}{A + (CG_{\sigma_{in}} + G_{\sigma_{out}})*I} \quad (2)$$

The preferred choices for the constants are to set B and D to unity, and C to approximately two. A new value for the constant A is preferably calculated for each new input image or set of images. The constant A is a parameter of the computation and a given value of this parameter will generally work well for a set of images as long as they are taken of similar imagery. A new value for the parameter A is preferably calculated every time there is a major change in the scene being imaged, eg., changing from imaging a forest to imaging a desert. The denominator of Equation (2) is the constant A plus a well known Sum of Gaussians (SoG) component. The constant A is preferably set to a value approximately equal to the average, over the entire image, of the SoG component. This relationship is shown explicitly in Equation (3), in which the bar over the right side of the equation indicates an average value.

$$A \approx \overline{(CG_{\sigma_{in}} + G_{\sigma_{out}})*I} \quad (3)$$

This form of shunting dynamics yields several beneficial results. Equation (1) insures that the value of each pixel, $x_i$, will always be between negative D and positive B (i.e., between negative 1.0 and positive 1.0 when the preferred choice of constants is used), regardless of the values of the input imagery. This allows systems according to the invention to process and combine different types of input imagery, since the center-surround shunt processing converts all input imagery to a form having the same dynamic range.

The numerator of Equation (2) is a variant of the well known Difference of Gaussian (DOG) operator. In the standard DoG operation, the weighting of the center region is equal to the weighting of the surround region, or in terms of Equation (2), the product of the constants, BC would equal the constant D. In the standard form, the DoG operation acts as a pure contrast filter (or band pass filter). In the preferred form for use in conjunction with the invention, the product of the constants BC (which is approximately two) is greater than the constant D (which equals one), and therefore, the preferred DoG operator acts as a "bandboost" filter. This form can be thought of as the standard DoG operator plus a central excitatory component. This form therefore produces an output image equal to the original image convolved with $G_{\sigma in}$ plus a pure contrast filtered image.

As stated above, the denominator of Equation (2) is the constant A plus the SoG component. Since the constant A was chosen to be near the average of the SoG component, regions of the image in which the constant A is small compared to the SoG component correspond to bright regions. In bright regions, Equation (2) provides ratio type processing, i.e., since A is small compared to the SoG component, the constant A can be neglected and the right hand side of Equation (2) becomes a quotient in which the original illuminant is present in both the numerator and denominator and therefore cancels out. Equation (2) then acts as a pure contrast filter in bright regions and discards the illuminant. This feature of Equation (2) provides localized automatic gain control and insures that bright areas in the input image do not saturate the contrast-enhanced output image. Similarly, in dark regions of the image, the constant A is large compared to the SoG component so in these regions, Equation (2) provides linear processing, and the contrast-enhanced image retains the original illuminant information. Finally, in regions where the constant A is approximately equal to the SoG component, Equation (2) provides monotonic processing which is a mixture of linear and ratio processing.

Equation (2) therefore provides localized automatic gain control and smoothly varies between linear processing (which retains the original illuminant information) in dark areas and ratio processing (which discards the original illuminant information to prevent saturation) in bright areas. FIG. 3 summarizes some of the features of Equations (1) and (2).

Returning to FIG. 1, processor 130 applies Equation (2) to input image signal 110 to produce the first processed image signal (contrast-enhanced image signal 120). Similarly, processor 132 applies Equation (2) to input image signal 112 to generate the second processed image signal (contrast-enhanced image signal 122). Contrast-enhanced image signals 120, 122 are then each applied to processor 134 which generates the third processed image signal (opponent color image signal 124) via Equation (4). Equation (4) is a variant of Equation (2) in which contrast-enhanced image signal 120 is applied to the center portion of the equation and contrast-enhanced image 122 is applied to the surround portion of the equation. Since input image signals 120 and 122 each have the same dynamic range, it is possible to combine them in this manner. Equation (4) serves as a mathematical model of single-opponent color contrast processing in the visual system, such as described qualitatively in Gouras, *Color Vision*, in ch. 31 of Principles of Neural Science (E. R. Kandell, J. H. Schwartz and T. M. Jessell ed., 3d ed. 1991). Further, depending on the type of input image signals used, it may be desirable to emphasize the information contained in one of the input image signals. This may be done by selecting one set of constants (of Equation (2)) for use in one of the processors 130 and 132, and selecting a different set for use with the other processor.

$$x_i = \frac{(BCG_{\sigma_{in}})*I_{120} - (DG_{\sigma_{out}})*I_{122}}{A + (CG_{\sigma_{in}})*I_{120} + (G_{\sigma_{out}})*I_{122}} \quad (4)$$

Processor 134 actually performs the identical calculations as processors 130 and 132, but processor 134 is fed by a data selector which on a pixel by pixel basis chooses pixels for the center computation from contrast-enhanced image signal 120 and chooses pixels for the surround computation from contrast-enhanced image signal 122. All of processors 130, 132 and 134, as well as the data selection and associated local storage may be established by a single programmed digital computer, although in alternate forms of the invention, separate dedicated processors may be used.

The preferred manner of displaying output image signals 120, 122, 124 is to apply each of them to one of the well known (R)ed, (G)reen, (B)lue inputs of an RGB color display monitor. In this manner, the invention combines two different input images into a single color output image. Another manner of generating a single color output image is to apply signals 120, 122, 124 to the (H)ue, (S)aturation, (V)alve inputs of an HSV color space to RGB color space transform operator and then apply the resultant modified R, G, and B signals to an RGB monitor.

As stated above, each input image signal 110, 112 corresponds to a different view of the same scene. Preferably, the input image signals are generated simultaneously by cameras responsive to different detectable characteristics (such as different portions of the electromagnetic spectrum) and each camera is focussed on the scene along a common axis with coincident fields of view. However, the invention illustrated in FIG. 1 will work well with input image signals generated under a variety of conditions. For example, the input image signals may be generated by the same camera and may be generated at different times, and perhaps from different viewing angles. Further, the images may be generated in response to other detectable characteristics such as an acoustic, or a radar (microwave) type characteristic.

Input image signals 110, 112 are preferably aligned such that corresponding pixels in the images each correspond to the same portion of the scene. However, such pixel-to-pixel alignment is difficult to achieve in practice, and is not required for proper functioning of the invention illustrated in FIG. 1. Alignment errors of a pixel or more will not degrade performance, however, input image signals 110, 112 should be generated or manipulated such that they are substantially registered. Preprocessing, prior to processors 130, 132 may be used to bring the input images into registration by compensating for camera misalignments and distortions.

Figure 4:
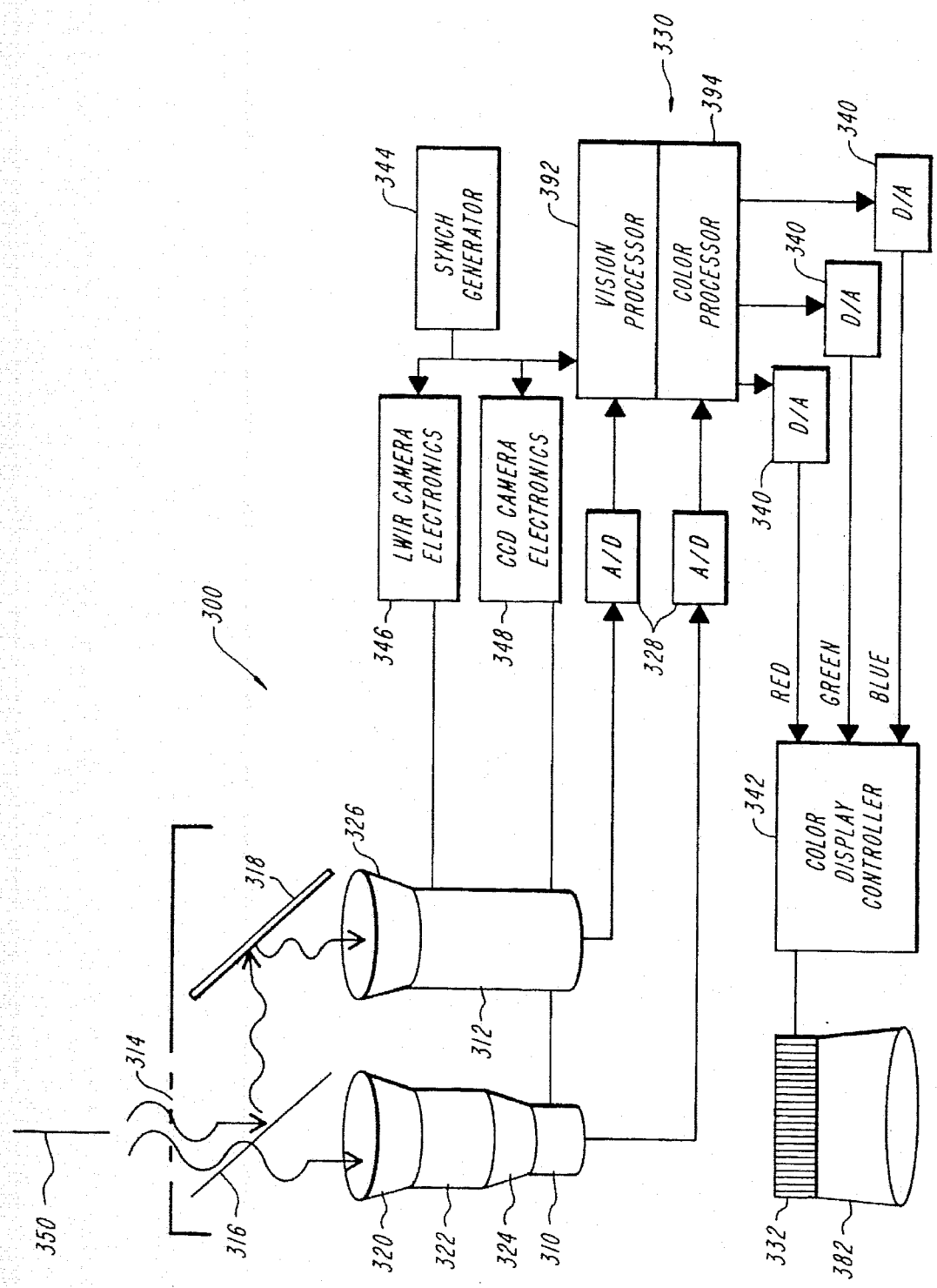
FIG. 4 is a block diagram showing one embodiment of a dual-band color night vision system according to the invention.

FIG. 4 shows one embodiment of a night vision system 300 which processes the image data according to the invention shown in FIG. 1. System 300 includes two cameras 310, 312 each of which is sensitive to a different portion of the electromagnetic spectrum. In the illustrated embodiment, camera 310 is sensitive to Visible Near-Infrared (VIS-NIR) light, and camera 312 is sensitive to Long Wave Infrared (LWIR) light.

Light propagating along an input axis 350 enters system 300 through an aperture or window 314 which is transmissive to VIS-NIR and LWIR light. Aperture 314 may be composed of, for example, zinc sulfide or zinc selenide. A dichroic mirror 316, or other such beam splitter, which is transmissive of VIS-NIR light and is reflective of LWIR light is mounted between aperture 314 and camera 310 such that mirror 316 transmits VIS-NIR light from aperture 314 towards camera 310. An LWIR mirror 318 is mounted between dichroic mirror 316 and camera 312 such that LWIR light entering through aperture 314 is reflected in turn by dichroic mirror 316 and LWIR mirror 318 towards camera 312. Dichroic mirror 316 may be/brined for example from a dielectric material deposited on a glass substrate. Dichroic mirror 316 is preferably fully transmissive of VIS-NIR light and fully reflective of LWIR light, however, in other embodiments, dichroic mirror 316 is only partially transmissive of VIS-NIR light and only partially reflective of LWIR light. In alternative embodiments, dichroic mirror 316 may be reflective of VIS-NIR light and transmissive of LWIR light, and the position of cameras 310 and 312 are reversed.

A lens 320 collects VIS-NIR light transmitted by dichroic mirror 316. Lens 320 is shown optically coupled to an image intensifier tube 322 which is in turn optically coupled through a second lens or fiber optic taper 324 to camera 310. An LWIR lens 326, which may be composed of germanium, is disposed to collect LWIR light reflected by mirror 318 and is optically coupled to LWIR camera 312.

The components of system 300 are selected and arranged such that cameras 310 and 312 share the same field of view and are focussed along a common axis 350. Therefore, cameras 310 and 312 generate image data representative of the VIS-NIR and the LWIR light, respectively, emanating from the same scene. Analog to digital converters 328 convert the analog outputs of cameras 310, 312 to digital signals which correspond to input image signals 110, 112 (shown in FIG. 1) and which are applied to processor 330. Processor 330 contains a vision processor 392 that functions according to the method described above in connection with FIG. 1 and generates, from the two input image signals, a contrast-enhanced VIS-NIR image signal, a contrast-enhanced LWIR image signal, and the opponent color image. Processor 330 may also contain a color processor 394 which as will be discussed further below receives the contrast-enhanced and opponent color images generated by processor 392 and generates therefrom color altered R, G, B signals for driving a display monitor 332. Processor 394 may produce digital output signals which are convened to analog signals by digital to analog converters 340 which then drive a standard display controller 342 which drives display monitor 332, or processor 394 may produce analog output signals which drive display controller 342 directly.

The invention described above in connection with FIG. 1 discussed generation of one set of three output images based on one set of two input images. As those skilled in the art will appreciate, processor 330 performs the same calculations on a time sequence of input images to generate a real time sequence of output image signals. Processor 330 may be implemented as an appropriately programmed digital computer, or as a portable battery powered chip set. In any case, processor 330 preferably has sufficient throughput to generate the output imagery at video rates with minimal latency, so as not to introduce appreciable perceptible lag.

Display monitor 332 is preferably a portable color monitor and may be implemented as a single chip display such as a Liquid Crystal Display (LCD) of the type manufactured by Kopin, Inc. of Taunton, Mass. Alternatively, display monitor 332 may be implemented as an Electro-Lumininescent Display (ELD), or as a single chip ELD. ELDs may be preferable to LCDs due to their higher resolution characteristics and lower power requirements. Display monitor 332 may be coupled to a lens 382 to facilitate viewing of the monitor 332.

In the preferred embodiment, camera sensing elements 310, 312 are separable from their control electronics. In the illustrated embodiment, electronics 346, 348 provide remote control of camera sensing elements 310, 312, respectively. Synch generator 344 drives electronics 346, 348 and processor 330, such that processor 330 regularly samples both cameras in a synchronized fashion.

In the preferred embodiment, camera 310 is sensitive to VIS-NIR reflected light having a wavelength in the 0.4 to 1.1 μm band, and more preferably in the 0.6–0.9 μm band, and camera 312 is sensitive to LWIR emitted light having a wavelength in the 7–13 μm band. In other embodiments cameras 310 and 312 may be sensitive to other portions of the spectrum.

As is well known, light absorption properties of the atmosphere define several atmospheric windows, or frequency bands which are favorable to the transmission of light without undue absorption. Four atmospheric windows useful for night vision are generally described as the VIS-NIR band (approximately 0.4–1.1 μm), the short wave infrared band (approximately 1.1–3 μm), the medium wave infrared band (approximately 3–5 μm), and the LWIR band (approximately 7–18 μm). The VIS-NIR and short wave infrared bands are dominated by reflected light, e.g., starlight, and the LWIR band is dominated by emitted light, and the medium wave infrared band is a crossover band which during daylight has approximately equal parts of reflected light and emitted light.

In other embodiments, cameras 310 and 312 may be sensitive to any of these bands or portions thereof. For example, another preferred sensitivity for infrared camera 312 is emitted light having a wavelength in the range of 3–5 μm. In other examples of acceptable arrangements, both cameras may be sensitive to portions of the spectrum dominated by emitted light, or both cameras may be sensitive to portions of the spectrum dominated by reflected light. In other embodiments, cameras 310, 312 may be responsive to other portions of the electromagnetic spectrum. Further, cameras 310, 312 may generate images representative of emitted or reflected energy. In still other embodiments, cameras 310, 312 may be acoustic imaging sensors such as ultrasound or sonar sensors, and may generate images representative of emitted or reflected acoustic energy.

LWIR camera 312 may be implemented as a well known cryogenically cooled Forward Looking Infrared (FLIR) camera. Preferably, camera 312 is implemented as a thereto-electrically cooled infrared camera such as the ferroelectric type sensing array produced by Texas Instruments, or as the bolometric type sensors produced by Loral Infrared & Imaging Systems (hereinafter collectively referred to as "TE IR") and which are described in Flannery and Miller, *Status of uncooled infrared imagers*, SPIE Vol. 1689 Infrared Imaging Systems (1992). The TE IR type sensors are advantageous over the cryogenically cooled cameras because they are far less bulky, require less power, and are far less expensive.

Camera 310 may be implemented as an electro-optic camera, such as a well known Charge Coupled Device (CCD) camera, which is coupled as shown to an image intensifier tube 322. Camera 310 may also be implemented as a portable camera having sufficient sensitivity so as to not require an image intensifier tube to produce good quality imagery from the visible and near infrared light that is available at night. One such camera is a Low-Light CCD camera of the type developed at Massachusetts Institute of Technology's Lincoln Laboratory and which are described for example in Reich et al., *Integrated Electronic Shutter for Back-Illuminated Charge-Coupled Devices*, IEEE Transactions on Electron Devices, Vol. 40, No. 7 (July 1993).

Thus, system 300 combines two input image signals (each of which is formed by a sensor responsive to a different detectable characteristic) to form a single color output image signal.

Figure 5:
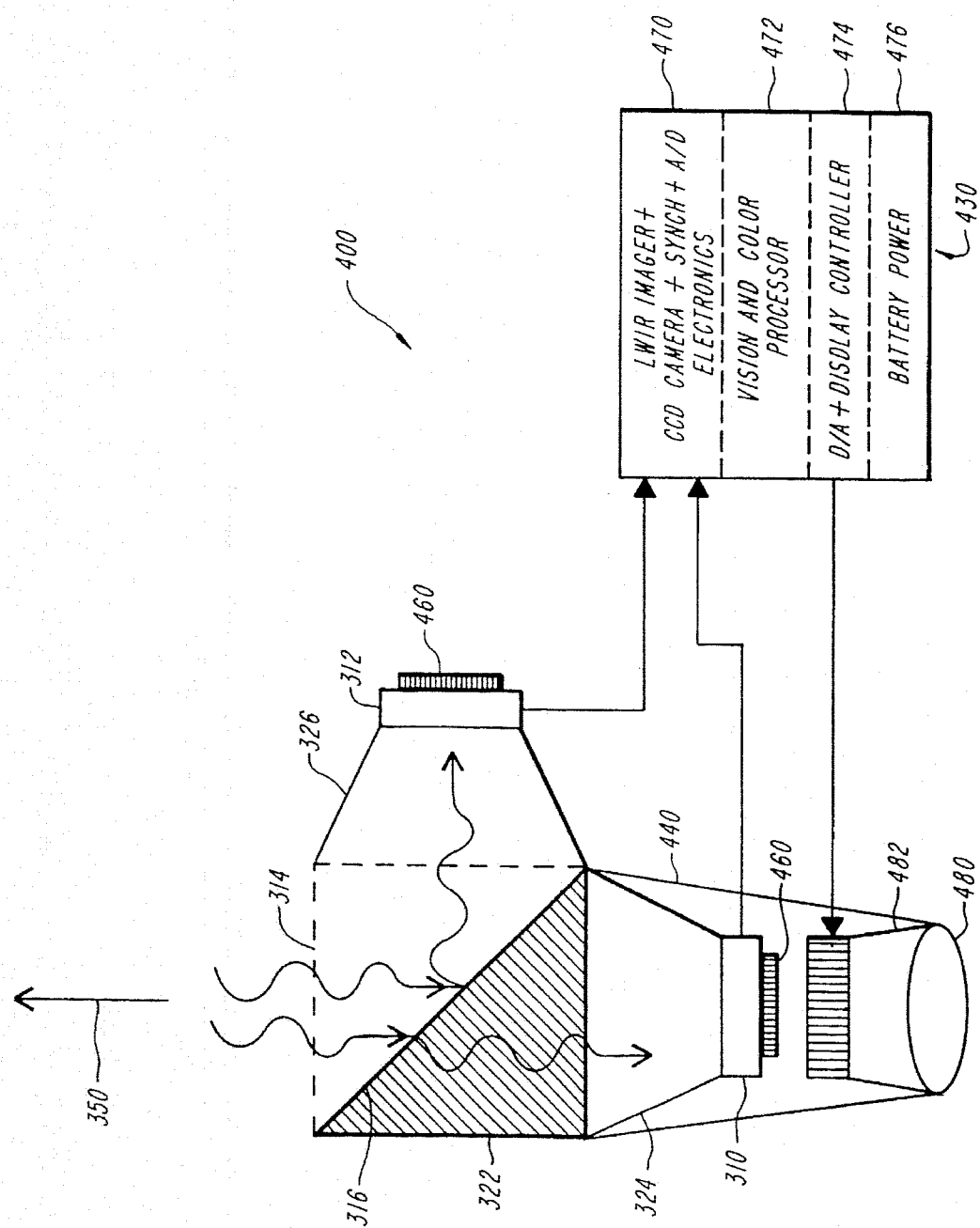
FIG. 5 is a block diagram showing an integrated and portable embodiment of a night vision system according to the invention.

FIG. 5 shows another embodiment of a night vision system 400 sensitive to VIS-NIR and LWIR light according to the invention. In system 400, VIS-NIR camera 310, lens 324, LWIR camera 312, lens 326, dichroic mirror 316, and display monitor 332 are all mounted within an outer casing 440 such that system 400 is portable. Portability is achieved in pan by implementing VIS-NIR camera 310 as a Low-Light CCD camera of the type referred to above, and by implementing LWIR camera 312 as a TE IR camera.

Light enters system 400 through window 314 which is transmissive of VIS-NIR light and LWIR light. Dichroic mirror 316 is preferably mounted on a glass wedge 416 and is aligned such that mirror 316 and wedge 416 transmit VIS-NIR light entering from window 314 towards lens 324 which is optically coupled to VIS-NIR camera 310. Dichroic mirror 316 further reflects LWIR light emerging from window 314 towards lens 326 which is optically coupled to LWIR camera 312. Cameras 310 and 312 may additionally be coupled to thermo-electric cooling units 460 which provide temperature stabilization. As with system 300 (shown in FIG. 4), cameras 310, 312 each share the same field of view and are focussed along a common axis 350. In this single mirror configuration, the images input to cameras 310, 312 form a "left-right reversed" pair. As will be discussed further below system 400 compensates for this reversal as well as other image distortions.

The analog (or possibly digital) output data signals of cameras 310 and 312 are applied to processor 430 which combines information from the two signals in a similar fashion as processor 330 (shown in FIG. 4) and generates the signals for driving display monitor 332. Processor 430 may be implemented as a portable battery powered chip set, which may be carried for example in a back pack or on a belt, and be electrically coupled to outer casing 440. Alternatively, processor 430 may be implemented as a remote non-portable processor, such as an appropriately programmed digital computer, that communicates with components in casing 440 via a radio link.

Processor 430 contains a synch stage 470, which includes components corresponding to analog to digital converters 328 of system 300, for converting the analog outputs of cameras 310, 312 to digital signals. Synch stage 470 further contains the electronics for controlling camera sensing elements 310, 312, and further contains synchronizing circuitry corresponding to synch generator 344 of system 300. Processor 430 further contains a processing stage 472 for combining the information from the two signals generated by cameras 310 and 312 and generating three output image signals in a similar fashion as processor 330. Synch stage 470 insures that processing stage 472 samples cameras 310 and 312 at regular intervals in a synchronized fashion. Processor 430 further contains a display controller 474 which performs functions analogous to color display controller processor 342 (shown in FIG. 4) and converts the output image signals produced by processing stage 472 into signals for driving display monitor 332. When implemented as a portable unit, processor 430 further includes a battery power source 476.

System 400 contains an eyepiece 480 which is integral to casing 440 for viewing the output of display monitor 332, and may further include an eyepiece lens 482 optically coupled to display 332. Eyepiece 480 and eyepiece lens 482 are preferably aligned with window 314 in monocular fashion such that apparatus 400 looks and feels like a standard monoscope, i.e., although no light passes from window 314 to eyepiece 480, an observer looking through eyepiece 480 does see a synthetic image generated in response to light that entered window 314. System 400 may be implemented as a hand held, helmet or head mounted monocular device. In alternative embodiments, system 400 may be implemented as a binocular device.

Figure 6:
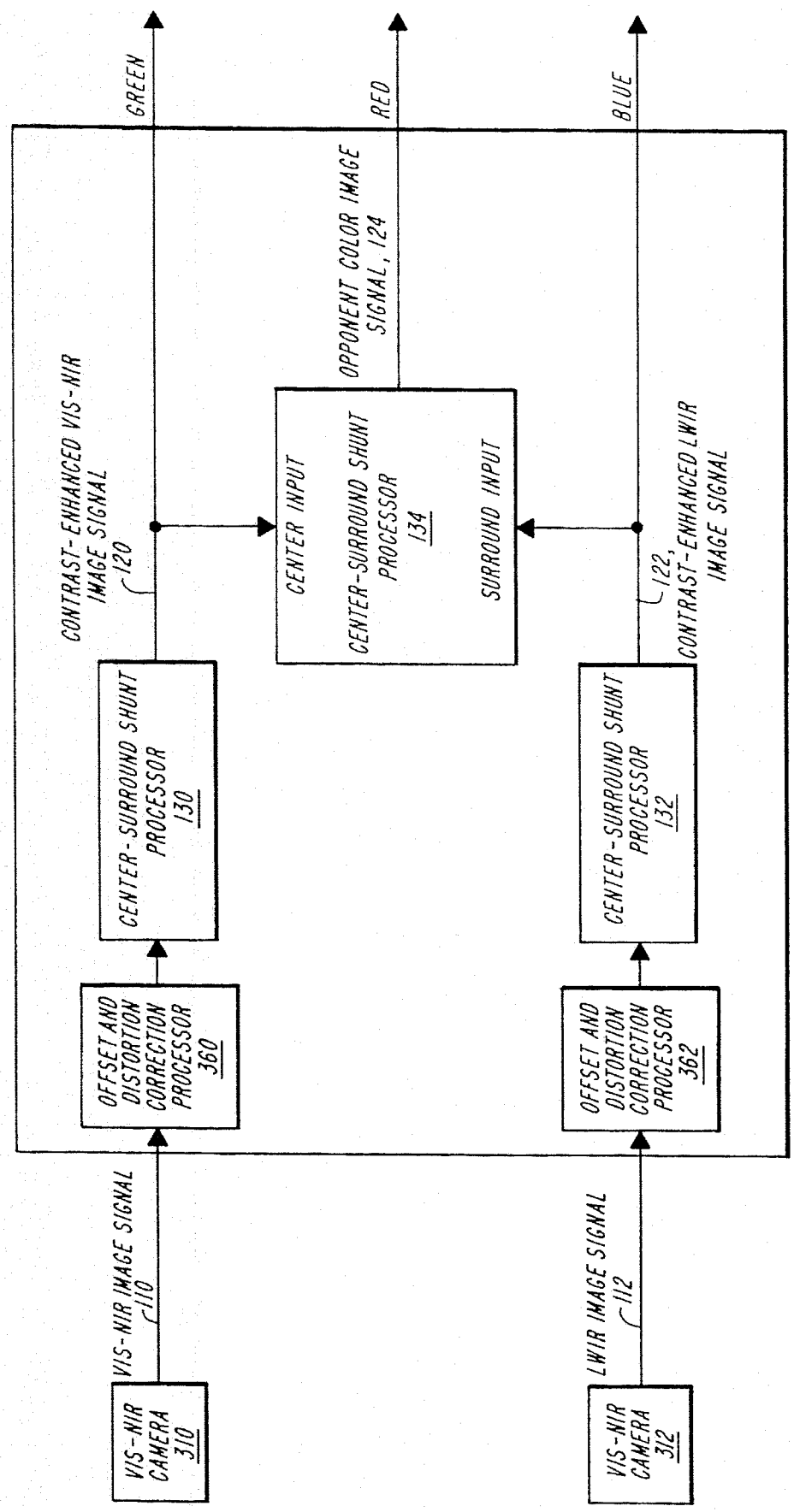
FIG. 6 is a block diagram illustrating the method used by the systems shown in FIGS. 4 and 5 to combine the two input image signals into a single output RGB color image.

FIG. 6 illustrates the operation of system 300 (shown in FIG. 4). This figure also serves to illustrate the operation of system 400 (shown in FIG. 5) since both systems operate in similar fashion. VIS-NIR camera 310 initially produces a VIS-NIR input image signal 110, and similarly, LWIR camera 312 produces a LWIR input image signal 112. Input image signals 110 and 112 are then applied to vision processor 392. Processor 392 may contain preprocessors 360, 362 which compensate for alignment, image reversal, distortion errors, and noise in image signals 110, 112, respectively. Center-surround shunt processor 130 then processes the VIS-NIR input image signal 110 in accordance with equation (2) to yield a contrast-enhanced VIS-NIR image signal 120. Similarly, center-surround shunt processor 132 processes the LWIR input image signal 112 in accordance with Equation (2) to yield a contrast-enhanced LWIR image signal 122. Both contrast-enhanced image signals 120, 122 are applied to center-surround shunt processor stage 134 which produces opponent color image signal 124. The three output image signals 120, 122, 124 may then be applied to the Green, Red, Blue inputs of display 332, or may be fed to color processor 394 (shown in FIG. 4) for further color processing.

As stated above, although it is desirable to align cameras 310 and 312 such that they produce pixel to pixel aligned hinges, such perfect alignment is not necessary for systems according to the invention to function well. In general, visible light imagery is sharper than infrared imagery since temperature boundaries tend to be much smoother than boundaries between areas of different reflectance. Therefore, infrared imagery can generally be considered "smoothed" or "blurred" compared to visible light imagery. This blurring minimizes the effect of small alignment errors of a pixel or more when VIS-NIR contrast-enhanced image signal 120 is overlaid with LWIR contrast-enhanced image signal 122. This same blurring also minimizes the effect of any small alignment errors in the creation of opponent color image signal 124, since VIS-NIR image signal (generally the sharper of the two images) feeds the central portion of the center-surround computation. The invention also functions well with the inputs to processor 134 reversed, with contrast-enhanced image signal 120 applied to the surround portion and contrast-enhanced image signal 122 applied to the center portion of the center-surround computation. However, since the VIS-NIR imagery is likely to be sharper, it is preferable to apply image signal 120 to the center portion of the computation as described above. Similarly, when a system according to the invention is using other forms of input imagery, the sharper of the two input images preferably feeds the center portion of the computation for producing the opponent color image.

Figure 7:
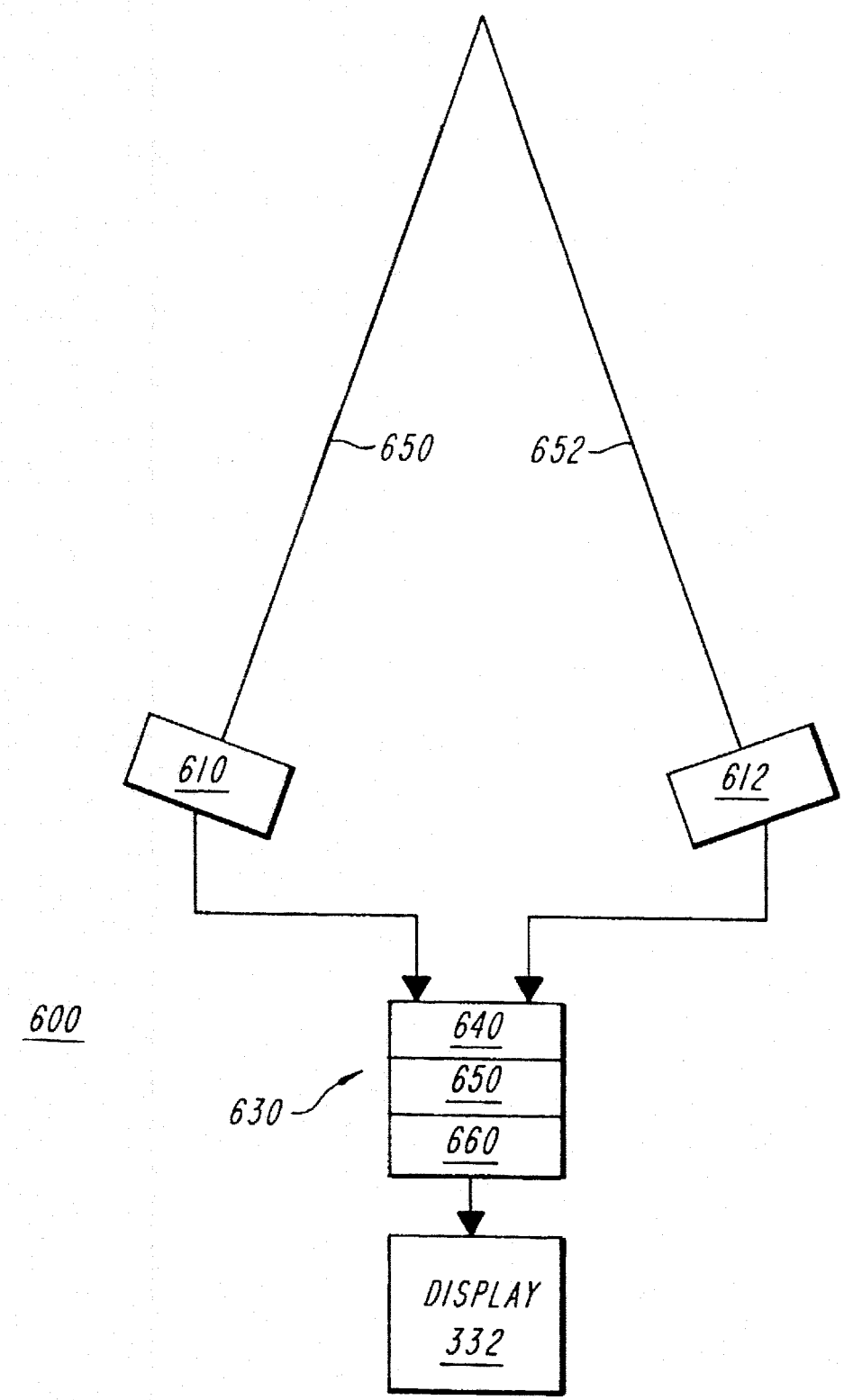
FIG. 7 is a block diagram of another system according to the invention in which the two cameras are angularly offset.

FIG. 7 shows a generic embodiment of a system 600 according to the invention. System 600 includes two cameras 610, 612, each focused on the same scene. In system 600, the cameras 610, 612 do not receive light propagating along the same axes, rather, camera 610 receives light propagating along axis 650 and camera 612 receives light propagating along axis 652. Axes 650, 652 may be parallel and spaced apart by a predetermined or an unknown distance, or they may be angularly offset and intersect at the scene. The outputs of cameras 610, 612 drive processor 630 which includes a first preprocessor 640 for bringing the output image signals of cameras 610, 612 into substantial registration, possibly with the aid of a three dimensional scene model, or more simply with the aid of a two dimensional map in the case of down-looking aerial imagery. The output image signals of cameras 610, 612 may initially be significantly out of registration, as long as there is enough information present in the image signals and external models for processor 640 to bring the image signals into registration. Further, cameras 610, 612 may generate their output signals at the same time, or at different times. The output of preprocessor 640 then drives processor 650, which processes the data in a similar fashion as processor 392 (shown in FIG. 4). The output of processor 650 then drives color processor 660 which performs color processing similar to color processor 394 and which in turn drives the output display 332.

Figure 8B:
FIGS. 8A and 8B are aerial long wave and short wave infrared photographs, respectively, of the same scene.
Figure 8A:
Figures 9A, 9B, 9C:
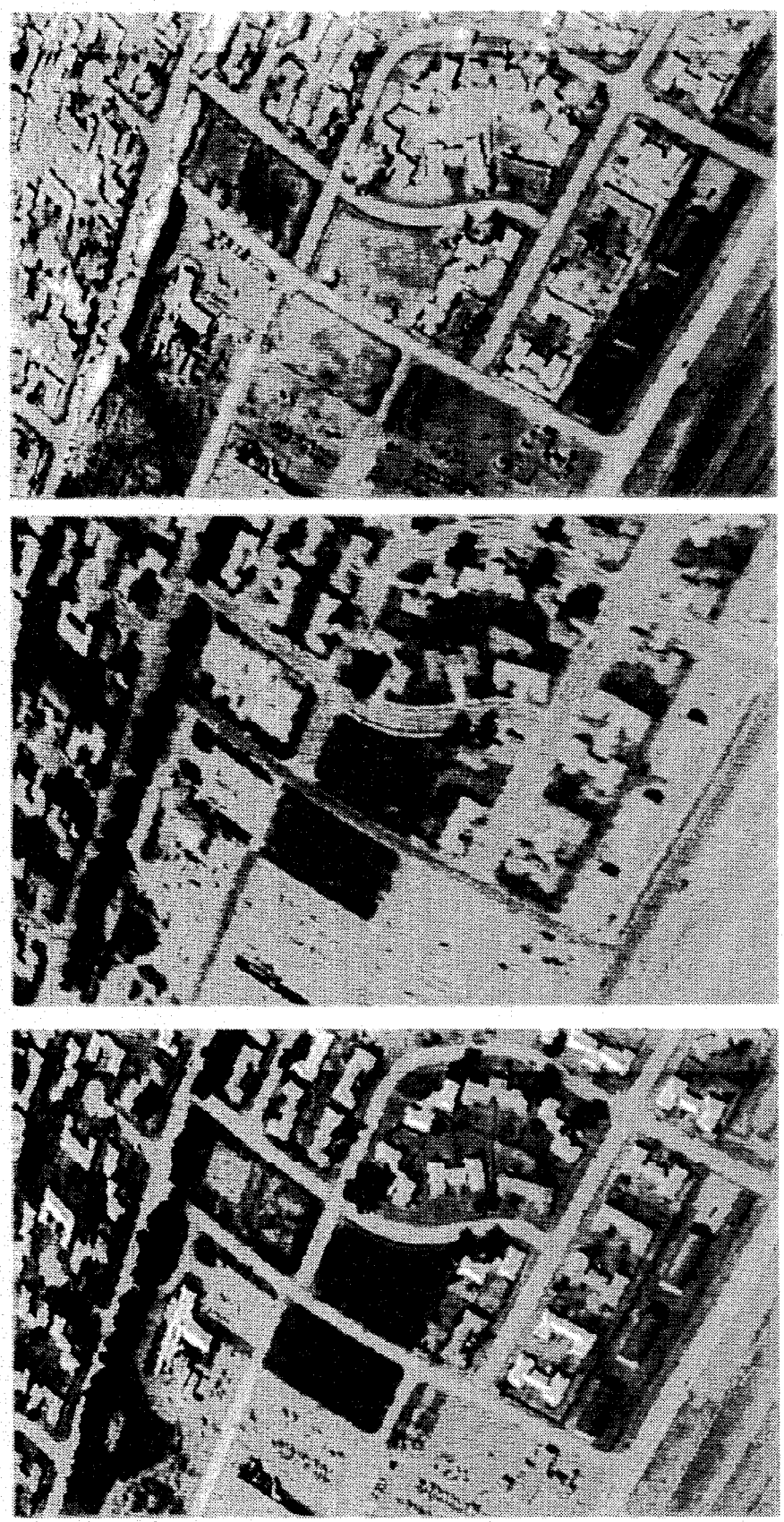
FIG. 9A is a contrast-enhanced image of the image shown in FIG. 8A and produced according to the invention illustrated in FIG. 1.
FIG. 9B is a contrast-enhanced image of the image shown in FIG. 8B and produced according to the invention illustrated in FIG. 1.
FIG. 9C is an opponent color image produced from the images shown in FIGS. 9A and 9B according to the invention illustrated in FIG. 1.

FIGS. 8 and 9 illustrate the performance of the invention shown in FIG. 1. FIGS. 8A and 8B are long wave and short wave aerial infrared photographs, respectively, of the same scene. FIGS. 9A and 9B are the long wave and short wave contrast-enhanced images, respectively, produced according to Equation (2) from the images shown in FIGS. 8A and 8B, and FIG. 9C is the opponent color image produced according to Equation (4) with the image shown in FIG. 9A driving the center portion of the computation and the image shown in FIG. 9B driving the surround portion of the computation. A color output image may be generated according to the invention by, for example, applying the opponent color image shown in FIG. 9C to the Red input, and the long wave infrared contrast-enhanced image shown in FIG. 9A to the Green input, and the short wave infrared contrast-enhanced image shown in FIG. 9B to the Blue input of a display monitor.

As stated above, in the preferred form of the invention one input is a reflected light image (e.g. visible, near infrared, or short wave infrared), and the other input is an emitted light image (e.g. medium wave infrared or long wave infrared). However the invention also functions well when both input images are emitted light images, or when both images are reflected light images. As those skilled in the art will appreciate, the invention will also function well with other kinds and combinations of input imagery.

Returning to FIG. 4, color processor 394 will now be discussed. Color processor 394 is optional in that the output image signals 120, 122, 124 generated by vision processor 392 may directly drive display 332. However, it is often desirable to perform a color mapping at stage 392 to produce a more satisfying output display.

Figures 2A, 2B, 10:
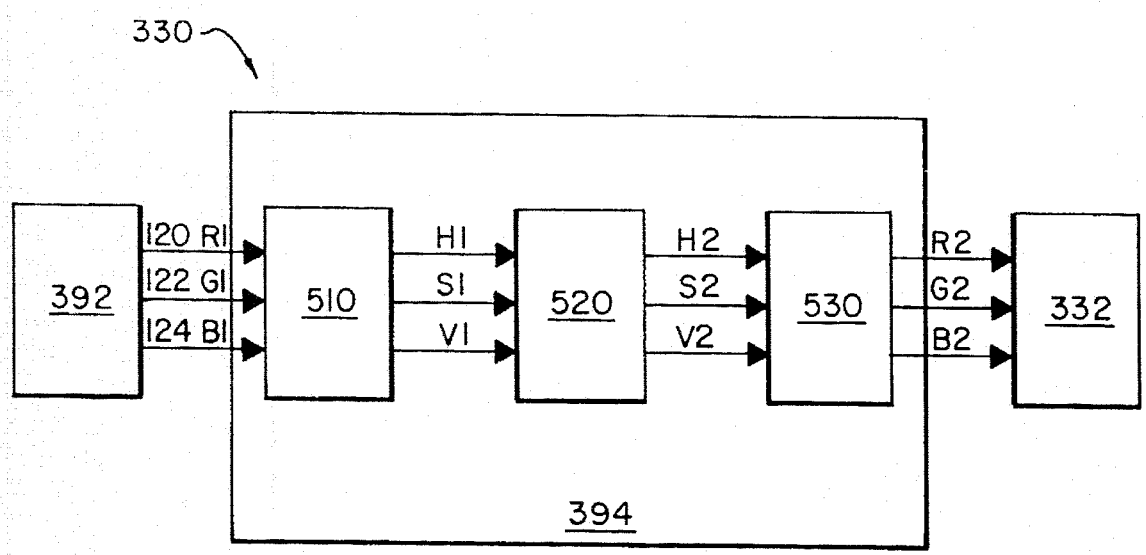
FIG. 2A shows a 5×5 Gaussian mask that may be used in conjunction with the center-surround processing according to the invention.
FIG. 2B shows a 9×1 Gaussian mask that may be used in conjunction with the center-surround processing according to the invention.
FIG. 10 is a block diagram showing a method according to the invention for altering the coloring of the output image generated by the invention shown in FIG. 1.

FIG. 10 illustrates the computations performed in color space by processor 394. As is obvious to those skilled in the art, the primary colors, Red, Green, and Blue form a basis for a color space in which all colors may be expressed. However, it is extremely difficult and non-intuitive to perform desirable color manipulations within this space. Processor 394 therefore contains stage 510 for transforming color vectors in the Red, Green, Blue color space to vectors in the well known Hue, Saturation, Value color space. The inputs to stage 510 are the three signals 120, 122, 124 produced by processor 392 and which form a color vector, R1, G1, B1, in the Red, Green, Blue color space. Stage 510 transforms this vector to the output vector H1, S1, V1. As those skilled in the art will appreciate, the vectors R1, G1, B1, and H1, S1, V1, describe exactly the same color. Stage 510 merely alters the manner in which that color is expressed.

Processing stage 520 then performs a color transformation and transforms the color input vector H1, S1, V1 to the output vector H2, S2, V2. This transformation is selected to alter the color scheme of the image in a desirable way, for example, stage 520 may map the orange tones in the input to the green tones in the output. Such a color transformation may be desirable so that certain familiar objects appear in their natural color in the final display, or so that certain elements of the scene are more easily perceived in the final synthetic image. Such color transformations are more convenient to perform in the Hue, Saturation, Value color space than in the Red, Green, Blue color space. It may be desirable to develop a pallet of transformations corresponding to different seasons and weather conditions as well as different types of input imagery and allow the user of the device to quickly select the color mapping to be applied.

Processing stage 530 then performs the inverse of the transform performed by stage 510, and transforms the vector H2, S2, V2, to the vector R2, G2, B2, in the Red, Green, Blue color space. The signals R2, G2, B2 then drive the display monitor 332.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having described the invention, what is claimed as new and secured by Letters Patent is:

1. A method for processing first and second digital image signals, each of said image signals being representative of a different two dimensional view of the same scene, each of said image signals including a two dimensional array of pixels, each of said pixels having an associated value representative of a detectable characteristic at a corresponding position in said scene, comprising the steps of:

A. center-surround shunt processing said first image signal to generate a first processed image signal including a two dimensional array of pixels, said processing including performing a computation associated with each pixel in said first image signal, wherein for each of said computations, pixels in a neighborhood including at least said associated pixel collectively form a central element for said computation, and pixels in a neighborhood at least surrounding said central element collectively form a surround element for said computation, wherein a result of each of said computations is a pixel of said first processed image signal, B. center-surround shunt processing said second image signal to generate a second processed image signal including a two dimensional array of pixels, said processing including performing a computation associated with each pixel in said second image signal, wherein for each of said computations, pixels in a neighborhood including at least said associated pixel collectively form a central element for said computation, and pixels in a neighborhood at least surrounding said central element collectively form a surround element for said computation, wherein a result of each of said computations is a pixel of said second processed image signal, C. center-surround shunt processing portions of said first and second processed image signals to generate a third processed image signal including a two dimensional array of pixels, said processing including a computation associated with each pixel in one of said first and second processed image signals, wherein for each of said computations, pixels in a neighborhood including at least said associated pixel form a central element for said computation, and pixels in a neighborhood at least surrounding a central element corresponding to said central element in the other of said first and second processed image signals form a surround element for said computation, wherein a result of each of said computations is a pixel of said third processed image signal.

2. The method according to claim 1 comprising the further step of:

applying said first, second, and third processed image signals to a respective one of the red (R), green (G), and blue (B) inputs of an RGB display device.

3. The method according to claim 2 comprising the further steps of:

transforming said first, second and third processed image signals in accordance with an RGB transform operator to generate corresponding hue, saturation, and value signals, allowing user modification of said hue, saturation, and value signals, and transforming said modified hue, saturation and value signals in accordance with an inverse RGB transform operator to generate corresponding modified R, G and B signals, and substituting said modified R, G and B signals at said R, G, and B inputs of said RGB display device.

4. The method according to claim 1 comprising the further steps of:

generating said first digital image signal whereby said first digital image signal is representative of reflected light from said scene, and generating said second digital image signal whereby said second digital signal is representative of emitted light from said scene.

5. The method according to claim 1 comprising the further steps of:

generating said first digital image signal whereby said first digital image signal is representative of reflected light from said scene, and generating said second digital image signal whereby said second digital signal is representative of reflected light from said scene.

6. The method according to claim 1 comprising the further steps of:
    generating said first digital image signal whereby said first digital image signal is representative of emitted light from said scene, and
    generating said second digital image signal whereby said second digital signal is representative of reflected light from said scene.

7. The method according to claim 1 comprising the further steps of:
    generating said first digital image signal whereby said first digital image signal is representative of emitted light from said scene, and
    generating said second digital image signal whereby said second digital signal is representative of emitted light from said scene.

8. The method of claim 1 further comprising the step of: generating said first and second digital image signals in response to the acquisition of data representative of detectable characteristics associated with each of said view of said scene.

9. The method of claim 8 wherein said detectable characteristics associated with each of said views of said scene are the same.

10. The method according to claim 9 wherein each of said detectable characteristics is selected from the group consisting of electromagnetic energy reflected from said scene, electromagnetic energy emitted from said scene, acoustic energy reflected from said scene, acoustic energy emitted from said scene.

11. The method according to claim 8 wherein said detectable characteristics associated with each of said views of said scene are different.

12. The method according to claim 11 wherein each of said detectable characteristics is selected from the group consisting of electromagnetic energy reflected from said scene, electromagnetic energy emitted from said scene, acoustic energy reflected from said scene, acoustic energy emitted from said scene.

13. The method according to claim 1 wherein said first digital image signal is representative of light from said scene having wavelengths in a first spectral range from the group consisting of 0.4–1.1 microns, 1.1–3 microns, 3–5 microns and 7.5–13 microns, and
    wherein said second digital image signal is representative of light from said scene having wavelengths in a second spectral range from the group consisting of 0.4–1.1 microns, 1.1–3 microns, 3–5 microns and 7.5–13 microns, and
    wherein said first spectral range and said second spectral range are substantially non-overlapping.

14. The method according to claim 1 wherein said first digital image signal is representative of light from said scene having wavelengths in the range 0.4–1.1 microns, and
    said second digital image is representative of LWIR light from said scene having wavelengths in the range 7.5–13 microns.

15. The method according to claim 1 wherein said first digital image signal is representative of light from said scene having wavelengths in a first portion of the range 0.4–1.1 microns, and
    said second digital image is representative of light from said scene having wavelengths in a second portion of the range 0.4–1.1 microns, wherein said first and second portions are substantially non-overlapping.

16. The method according to claim 1 wherein said first digital image signal is representative of LWIR light from said scene having wavelengths in the range 7.5–13 microns, and
    said second digital image is representative of light from said scene having wavelengths in the range 0.4–1.1 microns.

17. The method according to claim 1 wherein said first digital image signal is representative of LWIR light from said scene having wavelengths in a first portion of the range 7.5–13 microns, and
    said second digital image is representative of LWIR light from said scene having wavelengths in a second portion of the range 7.5–13 microns, wherein said first and second portion are substantially non-overlapping.

18. The method according to claim 1 further comprising the step of:
    generating said first and second digital image signals in response to the acquisition of data representative each of said views of said scene, each of said views being taken along an associated axis extending to said scene, said axes being substantially coincident.

19. The method according to claim 18 wherein said data acquisition for each of said views occurs at substantially the same time.

20. The method according to claim 19 wherein said first and second image data signals are representative of views of said scene that are substantially in registration.

21. The method according to claim 19 wherein said first and second image data signals are representative of views of said scene that are out of registration.

22. The method according to claim 18 wherein said data acquisition for each of said views occurs at times separated by a time interval.

23. The method according to claim 22 wherein said first and second image data signals are representative of views of said scene that are substantially in registration.

24. The method according to claim 22 wherein said first and second image data signals are representative of views of said scene that are out of registration.

25. The method according to claim 1 further comprising the step of:
    generating said first and second images in response to the acquisition of data representative of said views, each of said views being taken along an associated axis extending to said scene, said axes being angularly offset and substantially intersecting at said scene.

26. The method according to claim 25 wherein said data acquisition for each of said views occurs at substantially the same time.

27. The method according to claim 26 wherein said first and second image data signal are representative of views of said scene that are substantially in registration.

28. The method according to claim 26 wherein said first and second image data signals are representative of views of said scene that are out of registration.

29. The method according to claim 25 wherein said data acquisition for each of said views occurs at times separated by a time interval.

30. The method according to claim 29 wherein said first and second image data signals are representative of views of said scene that are substantially in registration.

31. The method according to claim 29 wherein said first and second image data signals are representative of views of said scene that are out of registration.

32. The method according to claim 1 wherein each of said computations for generating said first, second and third processed image signals includes calculating a difference between a weighted average of the values associated with the pixels in one of said central elements and a weighted average of the values associated with the pixels in one of said surround elements, and includes calculating a sum of a weighted average of the values associated with the pixels in one of said central elements and a weighted average of the values associated with the pixels in one of said surround elements, and includes calculating a quotient of said difference and said sum.

33. The method according to claim 32 wherein each of said weighted averages is a gaussian distributed weighted average.

34. The method according to claim 1 wherein each of said computations for generating said first, second and third processed image signals includes calculating a difference between a weighted average of the values associated with the pixels in one of said central elements and a weighted average of the values associated with the pixels in one of said surround elements, includes calculating a sum of a constant and a weighted average of the values associated with the pixels in one of said central elements and a weighted average of the values associated with the pixels in one of said surround elements, and includes calculating a quotient of said difference and said sum.

35. The method according to claim 34 wherein each of said weighted averages is a gaussian distributed weighted average.

36. A system for processing first and second digital image signals, each of said image signals being representative of a different two dimensional view of the same scene, each of said image signals including a two dimensional array of pixels, each of said pixels having an associated value representative of a detectable characteristic at a corresponding position in said scene, comprising:

A. means for center-surround shunt processing said first image signal to generate a first processed image signal including a two dimensional array of pixels, said processing means including first computation means for performing a computation associated with each pixel in said first image signal, wherein for each of said computations, pixels in a neighborhood including at least said associated pixel collectively form a central element for said computation, and pixels in a neighborhood at least surrounding said central element collectively form a surround element for said computation, wherein a result of each of said computations is a pixel of said first processed image signal, B. means for center-surround shunt processing said second image signal to generate a second processed image signal including a two dimensional array of pixels, said processing means including second computation means for performing a computation associated with each pixel in said second image signal, wherein for each of said computations, pixels in a neighborhood including at least said associated pixel collectively form a central element for said computation, and pixels in a neighborhood at least surrounding said central element collectively form a surround element for said computation, wherein a result of each of said computations is a pixel of said second processed image signal, and C. means for center-surround shunt processing portions of said first and second processed image signals to generate a third processed image signal including a two dimensional array of pixels, said processing means including third computation means for performing a computation associated with each pixel in one of said first and second processed image signals, wherein for each of said computations, pixels in a neighborhood including at least said associated pixel form a central element for said computation, and pixels in a neighborhood at least surrounding a central element corresponding to said central element in the other of said first and second processed image signals form a surround element of said computation, wherein a result of each of said computations is a pixel of said third processed image signal.

37. A system according to claims 36 further comprising:
means for generating said first digital image signal, wherein said first digital image signal is representative of reflected light from said scene having wavelengths in the range 0.4–1.1 microns, and means for generating said second digital image signal wherein said second digital image is representative of emitted light from said scene having wavelengths in the range 7.5–13 microns.

38. A system according to claim 37, wherein said first generating means includes:

A. a reflected light input optical assembly including means of receiving said reflected light from said scene to establish said view and for transferring said received light to an output optical port, B. an electro-optic camera having an input electro-optic port and means for generating a reflected light digital signal representative of light applied to said input electro-optic port, said reflected light digital signal corresponding to said first digital image data signal, and C. an image intensifier assembly coupled to said output optical port of said reflected light input optical assembly and including means for intensifying and transferring light from said output optical port to said input electro-optic port, and wherein said second generating means includes:

D. an emitted light input optical assembly including means for receiving said emitted light from said scene to establish said view and for transferring said received light to an output optical port, E. a thermal camera having an input thermal port and means for generating an emitted light digital signal representative of emitted light applied to said input thermal port, said emitted light digital signal corresponding to said second digital image data signal, F. coupler coupled to said output optical port of said emitted light input optical assembly including means for transferring light from said output optical port to said input thermal port.

39. A system according to claim 38 wherein said center-surround processing means are programmed digital computers.

40. A system according to claim 38 further comprising a common axis input assembly including:

A. aperture means for receiving said reflected light and said emitted light along a common axis from said scene, B. beam splitter including:
  i. means for transferring a portion of said reflected light received by said aperture means to said reflected light input optical assembly, and
  ii. means for transferring a portion of said emitted light received by said aperture means to said emitted light input optical assembly.

41. A system according to claim 40 wherein said reflected light transferring means of said beam splitter includes a dichroic mirror positioned along said common axis and substantially transparent of said reflected light, and wherein said emitted light transferring means of said beam splitter includes said dichroic mirror and an emitted light mirror, said dichroic mirror and said emitted light mirror being substantially fully reflective to said emitted light.

42. A system according to claim 37 further comprising a common axis input assembly including:
   i. aperture means for receiving said reflected light and said emitted light along a common axis from said scene,
   ii. beam splitter including:
      a. a dichroic mirror positioned along said common axis to receive said reflected light and said emitted light from said aperture means, said dichroic mirror being substantially transparent to said reflected light and substantially fully reflective to said emitted light,
      b. a first transfer medium and associated lens for transferring said reflected light passing through said dichroic mirror to said first generating means, and
      c. a second transfer medium and associated lens for transferring said emitted light reflected from said dichroic mirror to said second generating means.

43. A system according to claim 42 wherein said first generating means is a low light CCD array, and wherein said second generating means is a long wave infrared (LWIR) imager, wherein said emitted light is long wave infrared light.

44. A system according to claim 43, further comprising a display device and means for applying said first, second and third processed image signals to said display device, whereby a synthetic image is generated by said display device.

45. A system according to claim 44 wherein said common axis input assembly, said first generating means, said second generating means and said display device are within a single housing.

46. The system according to claim 36 further comprising:

an RGB display device and associated means for applying said first, second, and third processed image signals to a respective one of the red (R), green (G), and blue (B) inputs of said RGB display device.

47. The method according to claim 46 further comprising:

means for transforming said first, second and third processed image signals in accordance with an RGB transform operator to generate corresponding hue, saturation, and value signals, user controlled means for modifying said hue, saturation, and value signals, and means for transforming said modified hue, saturation and value signals in accordance with an inverse RGB transform operator to generate corresponding modified R, G and B signals, and means for substituting said modified R, G and B signals at said R, G, and B inputs of said RGB display device.

48. The system according to claim 36 further comprising:

means for generating said first digital image signal whereby said first digital image signal is representative of reflected light from said scene, and means for generating said second digital image signal whereby said second digital signal is representative of emitted light from said scene.

49. The system according to claim 36 further comprising:

means for generating said first digital image signal whereby said first digital image signal is representative of reflected light from said scene, and means for generating said second digital image signal whereby said second digital signal is representative of reflected light from said scene.

50. The system according to claim 36 further comprising:

means for generating said first digital image signal whereby said first digital image signal is representative of emitted light from said scene, and means for generating said second digital image signal whereby said second digital signal is representative of reflected light from said scene.

51. The system according to claim 36 further comprising:

means for generating said first digital image signal whereby said first digital image signal is representative of emitted light from said scene, and means for generating said second digital image signal whereby said second digital signal is representative of emitted light from said scene.

52. The system of claim 36 further comprising the step of: means for generating said first and second digital image signals in response to the acquisition of data representative of detectable characteristics associated with each of said view of said scene.

53. The system of claim 52 wherein said detectable characteristics associated with each of said views of said scene are the same.

54. The system according to claim 53 wherein each of said detectable characteristics is selected from the group consisting of electromagnetic energy reflected from said scene, electromagnetic energy emitted from said scene, acoustic energy reflected from said scene, acoustic energy emitted from said scene.

55. The system according to claim 52 wherein said detectable characteristics associated with each of said views of said scene are different.

56. The system according to claim 55 wherein each of said detectable characteristics is selected from the group consisting of electromagnetic energy reflected from said scene, electromagnetic energy emitted from said scene, acoustic energy reflected from said scene, acoustic energy emitted from said scene.

57. The system according to claim 36 further comprising:

input means for generating said first digital image signal, wherein said first digital image signal is representative of light from said scene having wavelengths in a first spectral range from the group consisting of 0.4–1.1 microns, 1.1–3 microns, 3–5 microns and 7.5–13 microns, and wherein said second digital image signal is representative of light from said scene having wavelengths in a second spectral range from the group consisting of 0.4–1.1 microns, 1.1–3 microns, 3–5 microns and 7.5–13 microns, and wherein said first spectral range and said second spectral range are substantially non-overlapping.

58. The system according to claim 57 wherein said input means is operative whereby said first digital image signal is representative of light from said scene having wavelengths in a first portion of the range 0.4–1.1 microns, and said second digital image is representative of light from said scene having wavelengths in a second portion of the range 0.4–1.1 microns, wherein said first and second portions are substantially non-overlapping.

59. The system according to claim 57 wherein said first digital image signal is representative of LWIR light from said scene having wavelengths in the range 7.5–13 microns, and said second digital image is representative of light from said scene having wavelengths in the range 0.4–1.1 microns.

60. The system according to claim 57 wherein said first digital image signal is representative of LWIR light from said scene having wavelengths in a first portion of the range 7.5–13 microns, and said second digital image is representative of LWIR light from said scene having wavelengths in a second portion of the range 7.5–13 microns, wherein said first and second portion are substantially non-overlapping.

61. The system according to claim 36 further comprising:

means for generating said first and second digital image signals in response to the acquisition of data representative each of said views of said scene, each of said views being taken along an associated axis extending to said scene, said axes being substantially coincident.

62. The system according to claim 61 wherein generating means for said first and second digital image signal is operative whereby said data acquisition for each of said views occurs at substantially the same time.

63. The system according to claims 62 wherein said first and second image data signal are representative of views of said scene that are substantially in registration.

64. The system according to claim 62 wherein said first and second image data signals are representative of views of said scene that are out of registration.

65. The system according to claim 61 wherein generating means for said first and second digital image is operative whereby said data acquisition for each of said views occurs at times separated by a time interval.

66. The system according to claim 65 wherein said first and second image data signal are representative of views of said scene that are substantially in registration.

67. The system according to claim 65 wherein said first and second image data signals are representative of views of said scene that are out of registration.

68. The system according to claim 36 further comprising:

means for generating said first and second images in response to the acquisition of data representative of said views, each of said views being taken along an associated axis extending to said scene, said axes being angularly offset and substantially intersecting at said scene.

69. The system according to claim 68 wherein generating means for said first and second digital image signal is operative whereby said data acquisition for each of said views occurs at substantially the same time.

70. The system according to claim 69 wherein said first and second image data signal are representative of views of said scene that are substantially in registration.

71. The system according to claims 69 wherein said first and second image data signals are representative of views of said scene that are out of registration.

72. The system according to claim 25 wherein generating means for said first and second digital image signal is operative whereby said data acquisition for each of said views occurs at times separated by a time interval.

73. The system according to claim 72 wherein said first and second image data signals are representative of views of said scene that are substantially in registration.

74. The system according to claim 72 wherein said first and second image data signals are representative of views of said scene that are out of registration.

75. The system according to claim 36 wherein each of said first, second, and third computation means includes means for calculating a difference between a weighted average of the values associated with the pixels in one of said central elements and a weighted average of the values associated with the pixels in one of said surround elements, includes means for calculating a sum of a weighted average of the values associated with the pixels in one of said central elements and a weighted average of the values associated with the pixels in one of said surround elements, and includes means for calculating a quotient of said difference and said sum.

76. The system according to claim 75 wherein each of said weighted averages is a gaussian distributed weighted average.

77. The system according to claim 36 wherein each of said first, second and third computation means includes means for calculating a difference between a weighted average of the values associated with the pixels in one of said central elements and a weighted average of the values associated with the pixels in one of said surround elements, includes means for calculating a sum of a constant and a weighted average of the values associated with the pixels in one of said central elements and a weighted average of the values associated with the pixels in one of said surround elements, and includes means for calculating a quotient of said difference and said sum.

78. The system according to claim 77 wherein each of said weighted averages is a gaussian distributed weighted average.

79. The system according to claim 36 further comprising:

means for generating said first and second images in response to the acquisition of data representative of said views, each of said views being taken along an associated axis extending to said scene, said axes being substantially parallel.

80. The system according to claim 79 wherein generating means for said first and second digital image signal is operative whereby said data acquisition for each of said views occurs at substantially the same time.

81. The system according to claim 80 wherein said first and second image data signal are representative of views of said scene that are substantially in registration.

82. The system according to claims 80 wherein said first and second image data signals are representative of views of said scene that are out of registration.

83. The method according to claim 1 comprising the further step of:

applying a first combination of said first, second, and third processed image signals to a first input of a color display device, applying a second combination of said first, second, and third processed image signals to a second input of said color display device, and applying a third combination of said first, second, and third processed image signals to a third input of said color display device.

84. The method according to claim 4, further comprising the steps of:

applying said first processed image signal to the green (G) input of an RGB display device, applying said second processed image signal to the blue (B) input of said RGB display device, and applying said third processed image signal to the red (R) input of said RGB display device.

85. The system according to claim 36 further comprising:

a color display device and associated means for applying a first combination of said first, second, and third processed image signals to a first input of said color display device, and associated means for applying a second combination of said first, second, and third processed image signals to a second input of said color display device, and associated means for applying a third combination of said first, second, and third processed image signals to a third input of said color display device.

86. The system according to claim 48, further comprising: an RGB display device and associated means for applying said first processed image signal to the green (G) input of said RGB display device, and associated means for applying said second processed image signal to the blue (B) input of said RGB display device, and associated means for applying said third processed image signal to the red (R) input of said RGB display device.

* * * * *

UNITED STATES PATENT AND TRADEMARK OFFICE
CERTIFICATE OF CORRECTION

PATENT NO. : 5,555,324  
DATED : December 3, 1996  
INVENTOR(S) : Allen M. Waxman et al.

Page 1 of 2

It is certified that error appears in the above-indentified patent and that said Letters Patent is hereby corrected as shown below:

In the drawings, Sheet 3, FIG. 3, replace the three occurrences of "$G_{0_{in}}$" with --$G_{\sigma_{in}}$--; and replace the three occurrences of "$G_{0_{out}}$" with --$G_{\sigma_{out}}$--.

In the drawings, Sheet 5, FIG. 5, replace the reference numeral "322" with the reference numeral --416--; in the block indicated at reference numeral 474, replace the word "DISDLAY" with the word --DISPLAY--; add the reference numeral "332" with a line connecting that reference numeral to rectangular element adjoining the top of element 482.

In the drawings, Sheet 6, FIG. 6, in the block indicated at reference numeral 312, replace the text "VIS-NIR" with the text --LWIR--.

Column 5, lines 48-51, delete the text "The file of this patent contains at least one drawing executed in color. Copies of this patent with color drawing(s) will be provided by the Patent and Trademark Office upon request and payment of the necessary fee.".

Column 7, line 26, replace the symbol "$G_{\sigma on}$" with the symbol --$G_{\sigma in}$--.

UNITED STATES PATENT AND TRADEMARK OFFICE
CERTIFICATE OF CORRECTION

PATENT NO. : 5,555,324
DATED : December 3, 1996
INVENTOR(S) : Allen M. Waxman et al.

It is certified that error appears in the above-indentified patent and that said Letters Patent is hereby corrected as shown below:

Column 10, line 25, replace "be/brined" with --be formed--.
Column 11, line 65, replace "thereto" with --thermo--.
Column 12, line 32, replace "pan" with --part--.
Column 13, line 55, replace "hinges" with --images--.

Signed and Sealed this

Fourth Day of March, 1997

*Attest:*

BRUCE LEHMAN

*Attesting Officer*     Commissioner of Patents and Trademarks